United States Patent
Barger

(10) Patent No.: US 6,571,830 B2
(45) Date of Patent: Jun. 3, 2003

(54) SOLENOID DRAIN VALVE ASSEMBLY FOR COMPRESSED AIR SYSTEMS

(75) Inventor: Bradley D. Barger, Monticello, MN (US)

(73) Assignee: Suburban Manufacturing, Inc., Monticello, MN (US)

( * ) Notice: Subject to any disclaimer, the term of this patent is extended or adjusted under 35 U.S.C. 154(b) by 62 days.

(21) Appl. No.: 09/924,291

(22) Filed: Aug. 8, 2001

(65) Prior Publication Data

US 2002/0020452 A1 Feb. 21, 2002

Related U.S. Application Data

(60) Provisional application No. 60/224,575, filed on Aug. 11, 2000.

(51) Int. Cl.[7] .............................................. F16K 11/18
(52) U.S. Cl. ...................................... 137/883; 137/887
(58) Field of Search ................................ 137/154, 206, 137/550, 883, 887

(56) References Cited

U.S. PATENT DOCUMENTS

| 1,722,804 | A | | 7/1929 | Kleinlercher | |
|---|---|---|---|---|---|
| 2,687,841 | A | * | 8/1954 | Churchman | |
| 3,014,687 | A | * | 12/1961 | Keisling et al. | 137/204 |
| 3,363,763 | A | | 1/1968 | Erickson | |
| 3,582,223 | A | * | 6/1971 | Bloom | 417/12 |
| 4,453,893 | A | * | 6/1984 | Hutmaker | 417/279 |
| 4,733,696 | A | * | 3/1988 | Baun | 137/883 |
| 5,035,582 | A | * | 7/1991 | Carroll et al. | 417/44.7 |
| 5,082,240 | A | | 1/1992 | Richmond | |
| 5,122,167 | A | | 6/1992 | Daniels | |
| 5,692,540 | A | * | 12/1997 | Huang | 137/624.11 |
| 6,068,447 | A | * | 5/2000 | Foege | 417/12 |

FOREIGN PATENT DOCUMENTS

EP                0 261 326         3/1988

* cited by examiner

Primary Examiner—John Fox

(57) ABSTRACT

A one piece valve body incorporates a built in strainer and a ball valve which can be used for cleaning out the strainer without any disassembly, and also serves the purpose of the manual drain that has to be in the system for code. Also the orifice to the valve is mounted on top of the strainer so gravity will help in keeping any debris that might get through the filter screen from entering and causing the valve to fail. The design of the inlet is such that a chamfer is machined on the inside so a standard female swivel fitting can be installed without adding a separate union. This valve body design can work for both direct acting or diaphragm operated valves.

5 Claims, 5 Drawing Sheets

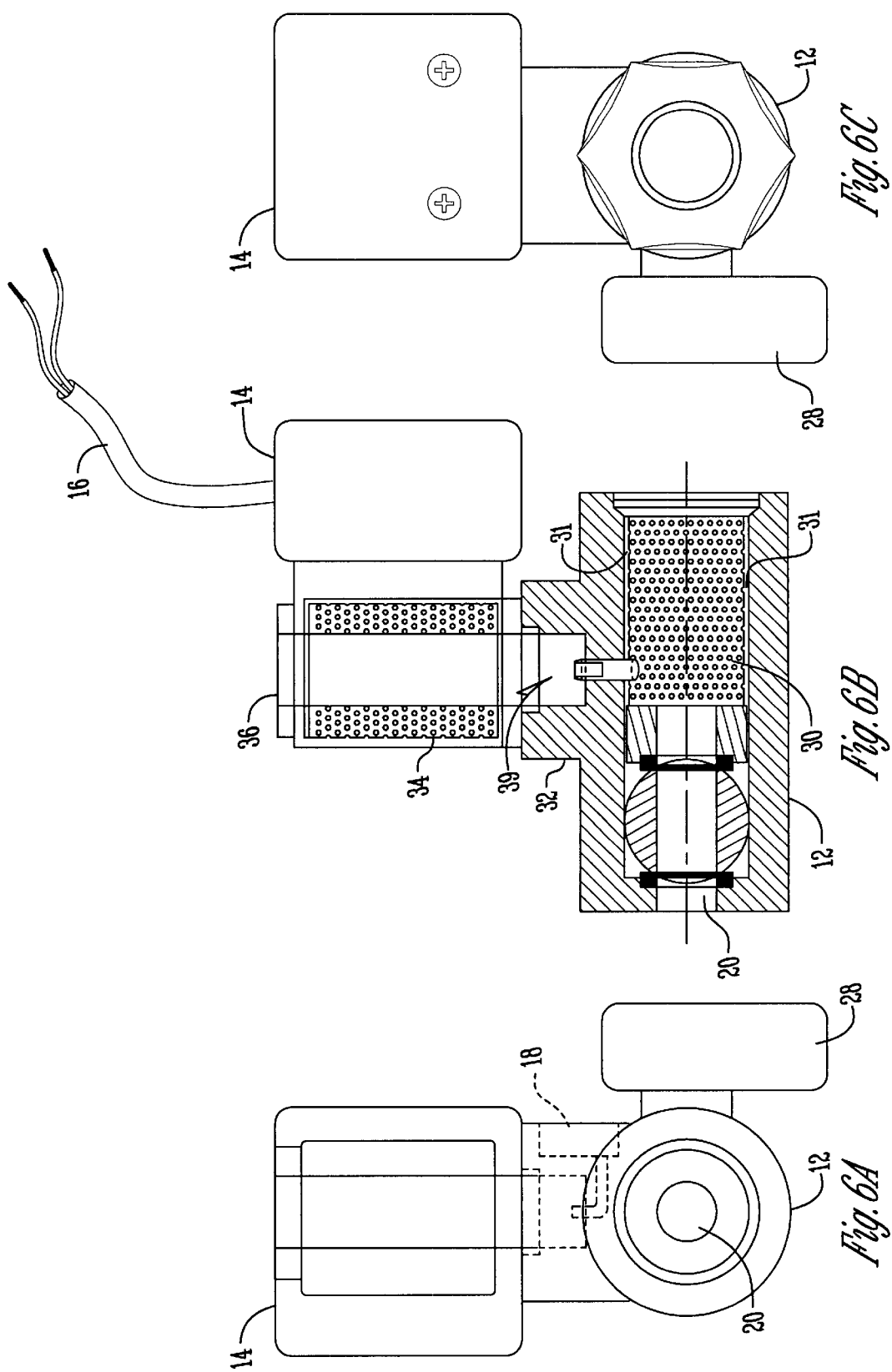

SOLENOID DRAIN VALVE ASSEMBLY FOR COMPRESSED AIR SYSTEMS

CROSS REFERENCE TO A RELATED APPLICATION

This application is based upon the Applicant's Provisional Patent Application Serial No. 60/224,575 filed on Aug. 11, 2000.

BACKGROUND OF THE INVENTION

Recently the Department of Energy (DOE) has introduced the Compressed Air Challenge, a nation wide program to reduce the amount of energy used by plants using compressed air. Specifically, the DOE issued the following press release in January 1998:

DOE LAUNCHES "COMPRESSED AIR CHALLENGE."

The US Department of Energy (DOE) has announced a new program designed to reduce US industry's electricity costs $150 million per year by helping manufacturers improve the efficiency of compressed air systems, which are considered industry's "fourth utility" after electricity, gas, and water. Compressed air systems use $1.5 billion per year in electricity—equal to Connecticut's overall electricity consumption or 1 percent of total US generation. The first-year goal of 10 percent improvement in efficiency would mean greenhouse gas emission reductions of about 700,000 tons of carbon per year by 2010, equivalent to removing 130,000 cars from the road. Compressed air system improvements can be achieved simply by eliminating air supply leaks, lowering air supply pressures, and properly maintaining components, supply lines, and filters. (DOE press release, January 1998)

Much expensive compressed air is wasted because of leaking air valves on compressed air systems. Just one drain valve leaking compressed air can cost a factory $1,000 per month. When this loss is multiplied by many leaking valves, the cost is a severe drain on a company's capital.

Further, the air valve replacement cost is expensive from a labor point of view because many plumbing fittings conventionally must be disassembled and reassembled. It is not uncommon for six to ten fittings to be involved in replacing a solenoid drain valve from an air compression tank.

The principal other problems associated with solenoid drain valves are as follows:

1. All valves need to have a strainer placed in an upstream position with respect to the valve to filter out dirt that could otherwise get underneath the seat and allow the valve to stick open wasting air.
2. Most external strainers that are used with valves allow for debris to escape and enter into the valves they are supposed to be protecting when they are opened to clean out the filter screen.
3. Most valves are harder to install very near the vessel that they are draining due to the swing radius of the valve about a central longitudinal axis. Extra parts or unions have to be supplied to make the installation in many applications.
4. Due to the fact that most air valves tend to plug, people normally set the time cycle for purging moisture from the lines to be on for more than is needed. This leads to much wasted air.
5. When current valves are installed on receiver tanks the manual drain that was in the bottom of the tank has to be replaced for code purposes, before the valve is installed, and this requires more fittings.

It is therefore a principal object of the invention to provide a solenoid drain valve where the valve member itself, usually a ball valve, and the screening element are both located in the valve body.

A further object of this invention is to provide a solenoid drain valve that is self cleaning.

A still further object of this invention is to provide a solenoid drain valve that can be replaced with a minimum number of plumbing fittings.

A still further object of this invention is to provide a solenoid drain valve as that can be cleaned without being disassembled.

These and other objects will be apparent to those skilled in the art.

SUMMARY OF THE INVENTION

A one piece air valve body incorporates a built in strainer and a ball valve which can be used for cleaning out the strainer without any disassembly. Also the orifice to the valve is mounted on top of the strainer so gravity will help in keeping any debris that might get through the filter screen from entering and causing the valve to fail. The design of the inlet is such that a chamfer is machined on the inside so a standard female swivel fitting can be installed without adding a separate union. This valve body design can work for both direct acting or diaphragm operated valves.

A solenoid connected to a timer periodically is energized to open the valve to open the valve and purge moisture collected in the system.

BRIEF DESCRIPTION OF THE DRAWINGS

FIG. 6A is an end elevational view as seen from the lefthand end of FIG. 1;

FIG. 6B is a longitudinal sectional view of the assembled valve; and

FIG. 6C is an end elevational view opposite to that of FIG. 6A.

DESCRIPTION OF THE PREFERRED EMBODIMENT

Figure 1:
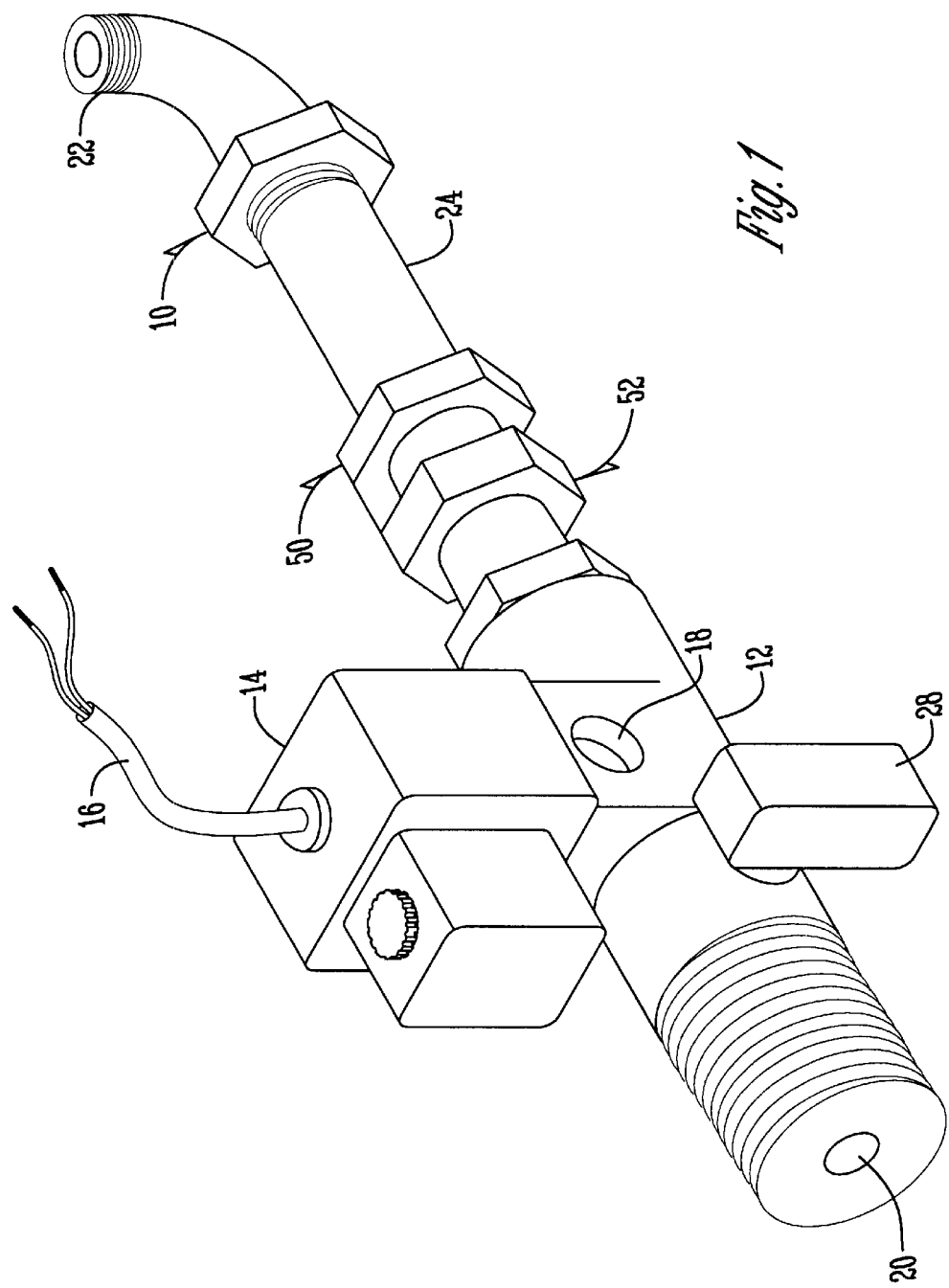
FIG. 1 is a perspective view of the valve assembly of this invention in assembled condition.

With reference to FIG. 1, the numeral 10 designates the solenoid valve assembly. The numeral 12 indicates the valve body to which has attached on the upper surface thereof a solenoid housing 14. A conventional power cable 16 (FIG. 6B) extends from the solenoid housing to provide power thereto.

Figure 2:
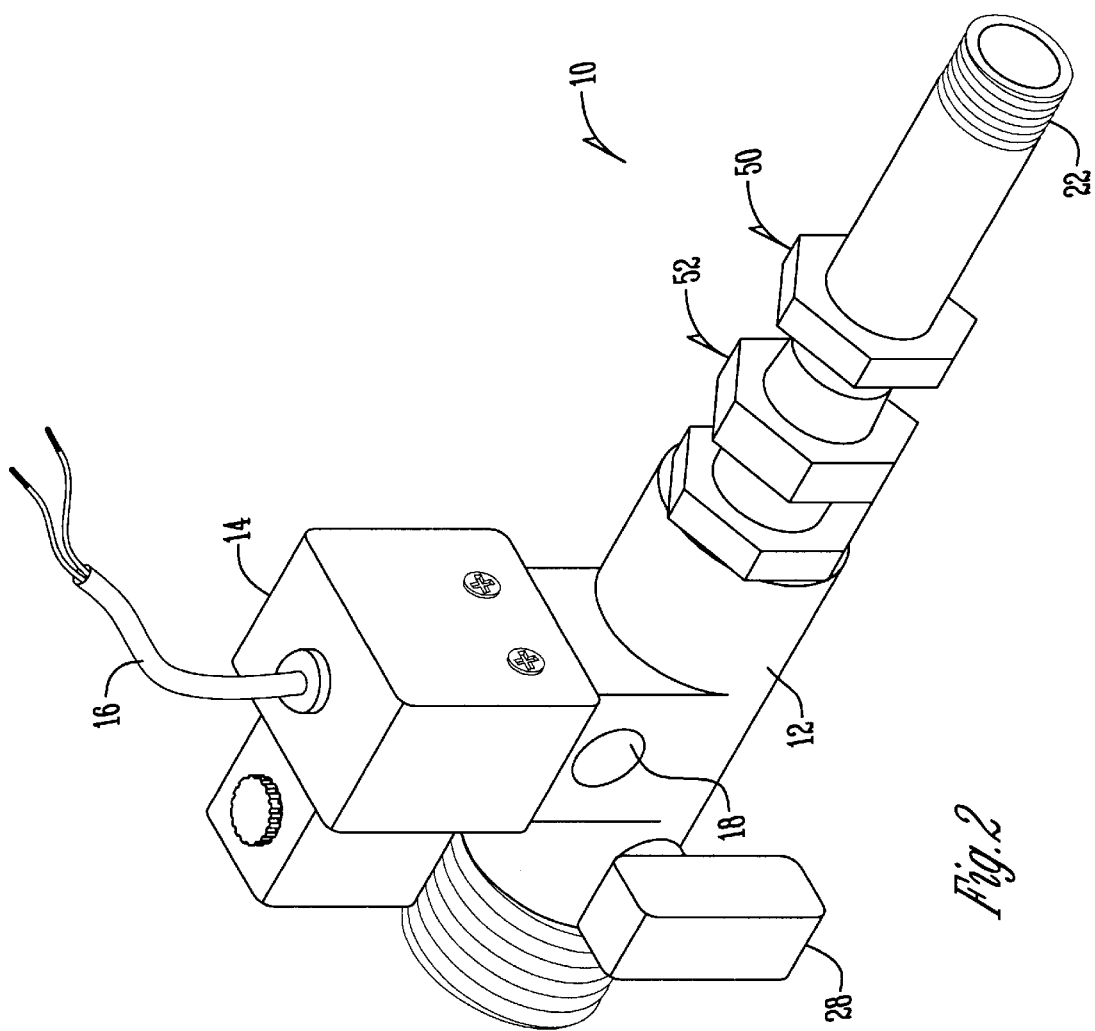
FIG. 2 is an enlarged scale perspective view taken from the opposite end of the device of FIG. 1 with the elbow fitting on FIG. 1 removed.

A primary fluid outlet port 18 located in the valve body 12 (FIG. 2). A secondary fluid outlet port 20 is located in one end of the valve body 12 (FIG. 6). Part 20 is both internally threaded and externally threaded for ease in connecting the valve body to different components.

As seen in FIG. 1, an elbow fitting 22 is secured to one end of nipple 24. The elbow is adapted to be secured to the bottom surface of an air compressor tank. The nipple 24 is connected to the valve body as will be more fully described hereafter.

Figure 5:
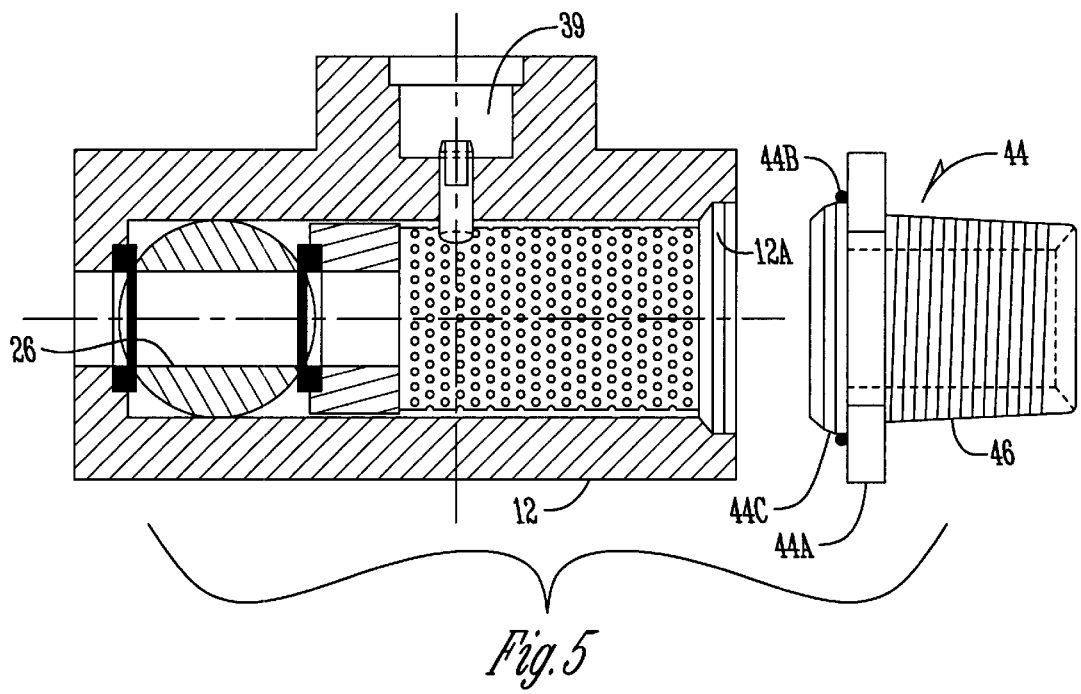
FIG. 5 is an exploded sectional view of the valve body.

A ball valve 26 is located within the valve body 12 as best shown in FIGS. 5 and 6. The ball valve is of conventional construction and includes a spherical ball with a longitudinal horizontal opening therethrough. When the manual lever 28, which is secured to the ball, aligns the opening with the port 20, the port 20 is open. When the manual lever 28 is rotated 90 degrees, the ball is rotated to close the port. This is conventional construction for a ball valve.

Figure 5A:
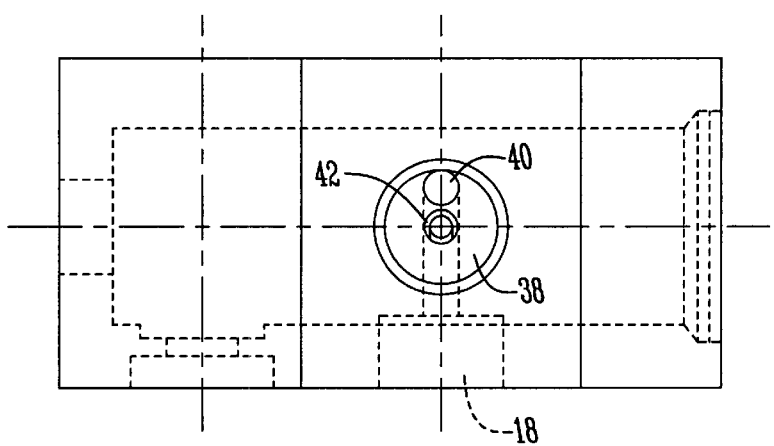
FIG. 5A is a top plan view of the valve body.

A filter screen 30 is also located within the body member 30 as shown in FIG. 6, and is surrounded by space 31 (FIG. 6B). An upstanding shoulder 32 extends upwardly from body 12 and the solenoid housing 14 is secured thereto. A solenoid coil 34 with a conventional solenoid plunger 36 are mounted within the housing 14. A poppet valve or the like 38 in the area 39 (FIG. 6B) is in communication with the space around filter screen 30 and is located within shoulder 32 when a conventional timer (not shown) causes the solenoid plunger 36 to rise. The poppet valve is actuated by the solenoid plunger 36. Fluid within the screen 30 can move through the poppet valve or the like 38 via the offset channel 40 (FIG. 5A), and this fluid can then depart and move through center channel 42 (FIG. 5A) to the outlet port 18.

One system of connecting valve body 12 to a compressed air system is shown in FIG. 5.

An inverted flare fitting 44 is shown in the upper right-hand corner of FIG. 5. It has a tapered threaded barrel 46 which facilitates its connection to a conventional swivel pivot member to facilitate its attachment to nipple 24. The member 44 has a hex shaped nut shoulder formed at its rearward end and identified by the numeral 44A. Threads 44B adjacent thereto permit the member 44 to be threaded into the inlet end 12A of valve body 12. A seal ring 44C can be placed adjacent the threads 44B to insure the tight seal of the member 44 in the inlet opening 12A of body member 12.

Figure 3:
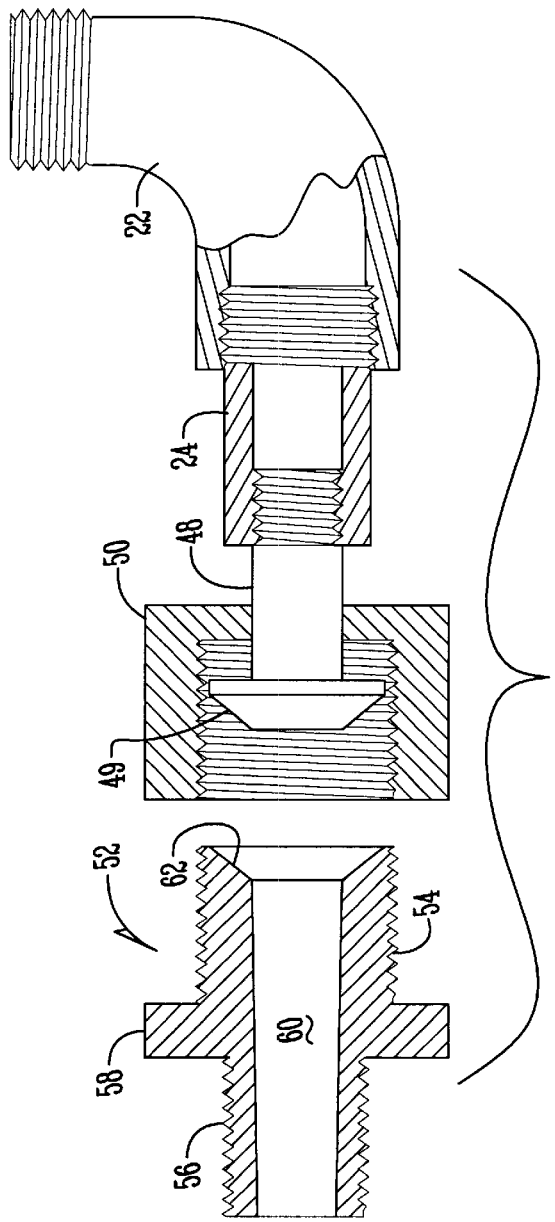
FIG. 3 is an enlarged scale exploded sectional view of one style of plumbing connection components.
Figure 4:
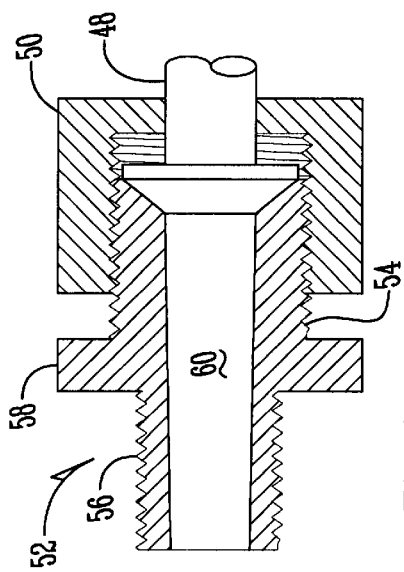
FIG. 4 is a partial sectional view of the assembled components of FIG. 3.

With reference to FIG. 3, an alternate form of a connection is shown involving an elongated connector stem 48 which is threadably received in one end of nipple 24. A seal connector 49 is located on the outward end of stem 48. A conventional swivel nut 50 is located on stem 48. A coupling 52 has first external threads 54 which are adapted to be threadably received within the internal threads of swivel nut 50 as best shown in FIG. 4. A second set of external threads 56 are present on member 52 and can be threadably inserted into the inlet end 12A of body member 12. A hex nut shoulder 58 is located on coupling 52 so that it can be rotated to effect the threaded connection to adjacent components. Coupling 52 has a center bore 60 and a seat 62 to receive seal connector 49 of connector stem 48 (FIGS. 3 and 4). The components of FIGS. 3 and 4 can accommodate the member 44 of FIG. 5 by suitable conventional connections (not shown).

It should be noted that the discharge port 18 is mounted on the top of body member 12 so that the strainer or screen 30 so as to help in keeping any debris that might get through the screen from entering and causing the valve to fail.

In practice, the valve 12 and related components can be easily replaced merely by disconnecting the swivel nut 50 which will separate the valve body member 12 from the nipple 24. If it is necessary to remove the nipple and the elbow connector from the bottom of the tank, this can easily be done by rotating the assembled components about the threads on the elbow connector. If room is not available for this, the nipple can be rotated about its axis and disconnected from the elbow. In any event, the disassembly and reassembly of the valve 12 has substantially reduced the number of plumbing connections necessary as compared to conventional solenoid valve units.

The valve body 12 can be connected in reverse manner as compared to that described above, but the most convenient manner is that shown in the drawings and described above. When space is at a minimum, the swivel connection shown in FIG. 5 will allow the valve body 12 to be rotated about its center axis as convenience requires.

In instances where it is necessary to drain the compression tank or otherwise clean the strainer 20 or the ball valve 26, the manual lever 28 is rotated 90 degrees to open the ball valve as described heretofore. Compressed air pressure available at the inlet end 12A of body member 12 will provide a blast of air which will serve to adequately clean both the filter screen 30 as well as the ball valve 26.

It should also be noted that every time the poppet valve 38 (or other valve) is momentarily opened by the solenoid, the fluid around filter screen 30 is immediately available to the atmosphere and outlet port 18 so that the system is purged by compressed air every time the poppet valve or the like opens. This serves to continuously remove any slight debris that may have accumulated while the system is operating, as well as any moisture that may have accumulated in the air system. All of these benefits result from the strainer 30 and the ball valve 26 being a part of the unitary valve body 12.

It is therefore seen that this invention will achieve at least all of its stated objectives.

I claim:

1. A solenoid drain valve for compressed air systems, comprising, a valve body member having a center bore with an inlet end and an outlet end, a cylindrical filter screen in the bore adjacent the inlet end, an open portion in the bore around the filter screen, a discharge valve on the valve body member in communication with the bore a solenoid mechanism connected to the discharge valve to intermittently open and close the discharge valve to discharge moisture present in the valve body member, a secondary discharge port at the outlet end of the bore, and a manually operated valve in the bore between the filter screen and the secondary discharge port.

2. The valve of claim 1 wherein the discharge valve is located on an upper portion of the valve body.

3. The valve of claim 1 wherein an inverted flare fitting is mounted in the inlet end of the bore, the flare fitting being connected to one end of a pipe nipple by a swivel nut, and means for connecting the other end of the nipple to an air compressor tank.

4. The drain valve of claim 1 wherein the discharge valve and solenoid mechanism are positioned above the valve body member.

5. The drain valve of claim 1 wherein the manually operated valve is a ball valve.

* * * * *